US008770950B2

(12) United States Patent
Biester

(10) Patent No.: US 8,770,950 B2
(45) Date of Patent: Jul. 8, 2014

(54) PUMP DEVICE FOR THE HYDRAULIC ACTUATION OF A VALVE

(75) Inventor: Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 271 days.

(21) Appl. No.: 13/096,934

(22) Filed: Apr. 28, 2011

(65) Prior Publication Data

US 2011/0200457 A1 Aug. 18, 2011

Related U.S. Application Data

(63) Continuation of application No. 10/564,584, filed as application No. PCT/EP2004/007948 on Jul. 16, 2004.

(30) Foreign Application Priority Data

Jul. 17, 2003 (DE) .................................... 20311033
Jul. 16, 2004 (EP) .................. PCT/EP2004/007948

(51) Int. Cl.
*F04B 35/04* (2006.01)

(52) U.S. Cl.
USPC ............................................ 417/415; 166/53

(58) Field of Classification Search
USPC .............. 166/53, 386, 332.8, 334.2; 137/467, 137/478.5; 251/1.1, 248, 129.11; 417/415
See application file for complete search history.

(56) References Cited

U.S. PATENT DOCUMENTS

| 1,852,560 A | 4/1932 | Giese, Jr. |
| 1,852,562 A | 4/1932 | Giese, Jr. |
| 3,261,591 A | 7/1966 | Campbell et al. |
| 4,119,016 A | 10/1978 | Pfeil et al. |
| 4,222,725 A | 9/1980 | Rodgers, Jr. |
| 4,276,003 A | 6/1981 | Perkins et al. |
| 4,398,110 A | 8/1983 | Flinchbaugh et al. |
| 4,442,395 A * | 4/1984 | Salina et al. .................. 320/134 |
| 4,645,178 A * | 2/1987 | Martin .......................... 251/229 |
| 4,862,911 A * | 9/1989 | Yie .............................. 137/454.4 |

(Continued)

FOREIGN PATENT DOCUMENTS

| DE | 2038369 | 6/1971 |
| DE | 2011402 | 9/1971 |

(Continued)

OTHER PUBLICATIONS

International Search Report for Appl. No. PCT/EP2004/007948 dated Feb. 12, 2004; (3 p.).

(Continued)

*Primary Examiner* — Charles Freay
*Assistant Examiner* — Philip Stimpert
(74) *Attorney, Agent, or Firm* — Fletcher Yoder P.C.

(57) ABSTRACT

Pump device for hydraulically activating a valve in particular used for oil and gas exploration wherein such a valve may be a safety valve assigned to a riser or a tree, said pump device including a piston cylinder unit from which pressurized hydraulic fluid can be pumped in direction to the valve. To improve such a pump device so that the pressure of the hydraulic fluid is produced in particular at the corresponding site and near to the valve and is safe and constructed in a simple way an electrical drive means is movably connected to a piston of the piston cylinder unit for alternating movement in axial direction of the piston within the cylinder.

28 Claims, 2 Drawing Sheets

(56) References Cited

U.S. PATENT DOCUMENTS

| | | |
|---|---|---|
| 5,358,035 A | 10/1994 | Grudzinski |
| 6,208,923 B1 | 3/2001 | Hommel |
| 2002/0108747 A1* | 8/2002 | Dietz et al. .................. 166/66.7 |

FOREIGN PATENT DOCUMENTS

| | | |
|---|---|---|
| DE | 19880317 C2 | 6/1999 |
| DE | 19955080 A1 | 5/2001 |
| EP | 0433649 A1 | 6/1991 |
| WO | 9508860 A1 | 3/1995 |
| WO | 0165061 A1 | 9/2001 |
| WO | 2005111484 A2 | 11/2005 |

OTHER PUBLICATIONS

Examination Report for Appl. No. GB0603045.6 dated Jun. 26, 2006 (2 p.).

* cited by examiner

PUMP DEVICE FOR THE HYDRAULIC ACTUATION OF A VALVE

CROSS REFERENCE TO RELATED APPLICATIONS

This application is a continuation of U.S. patent application Ser. No. 10/564,584, entitled "Pump Device for the Hydraulic Actuation of a Valve", filed Jan. 13, 2006, which is herein incorporated by reference in its entirety, which is the U.S. National Phase Application of International Application No. PCT/EP2004/007948, entitled "Pump Device for the Hydraulic Actuation of a Valve", filed Jul. 16, 2004, which is herein incorporated by reference in its entirety, which claims benefit of German Application No. 203 11 033.1, filed Jul. 17, 2003, which is herein incorporated by reference in its entirety.

BACKGROUND

The invention relates to a pump device for the hydraulic actuation of a valve, especially employed in the production of crude oil or natural gas, as a safety valve assigned to a pipeline or to a tree, with a piston-cylinder unit from which hydraulic fluid can be pumped under pressure in the direction of the valve.

Corresponding pump devices are known from practice, which are generally arranged far away from the actual valve and do not just supply it with hydraulic fluid, but also other equipment, in particular for crude oil or natural gas production. The appropriate valve is in this respect assigned to a pipeline or similar facility as a safety valve and is generally termed a downhole safety valve. In marine crude oil or natural gas production it is arranged along the pipeline and below the surface of the sea and is used for closing the pipeline in the case, for example, of a leak or similar problem.

With such safety valves it has however been found that often a leak occurs and already after a relatively short time a corresponding hydraulic fluid has run out, even out of a corresponding storage container. In addition a hydraulic fluid under pressure cannot be passed specifically to a certain safety valve at the point of application or relatively near to the safety valve, but rather generally long hydraulic fluid pipes are required, whereby at the most an appropriate reservoir for hydraulic fluid is arranged where applicable at the point of application at the safety valve. However, also here the appropriate leakage problems occur.

SUMMARY OF SPECIFIC EMBODIMENTS

The object of the invention is to improve a pump device of the type mentioned at the beginning such that the hydraulic fluid pressure, in particular at the point of application and in the vicinity of the actual valve, can be constructively simply produced in a safe and controlled manner.

This object is solved by the pump device with the features of claim 1.

According to the invention an electrical drive device is used which is movably connected to the appropriate piston of the piston-cylinder unit for its alternating movement in the piston longitudinal direction within the associated cylinder. Through the electrical drive device an electrically driven pump device pumping hydraulic fluid is provided which can specifically feed hydraulic fluid to a safety valve, whereby the corresponding pressure of the hydraulic fluid can be set and monitored by means of the electrical drive device.

The electrical drive device in this respect exhibits sufficient power to generate adequate hydraulic pressure for the valve.

The drive device can be actuated and its activity monitored by means of appropriate electrical connecting lines.

Preferably according to the invention an electrical drive device can be used which exhibits a spindle drive, a reduction gear, a spur gear and at least one drive shaft with at least one electric motor to turn it. Through this combination of subgroups an electrical drive device is produced which operates extremely free of maintenance and can be controlled and regulated accurately and can also be used for many other devices in the production or mining of crude oil and natural gas.

The rotational speed of the electric motor is reduced by the reduction gear, spur gear and also the spindle drive so far that also slight piston displacements are possible. Consequently the hydraulic pressure or the quantity of the hydraulic fluid, which is pumped through the pump device in the direction of the valve, can be set extremely precisely.

In order to adapt the spindle drive in a simple manner to the alternating movement of the piston in the piston longitudinal direction, the spindle drive can exhibit a rotatable, but axially immovable spindle nut and an axially movable threaded spindle.

The corresponding axial movement of the threaded spindle can be converted into a movement of the piston in the piston longitudinal direction.

With a simple embodiment the threaded spindle can be releasably joined at its actuating end to the piston. In this way other intermediate components can be omitted, whereby the construction of the pump device is extremely compact.

A low-wear and heavy duty reduction gear, which also contributes to the compactness of the pump device according to the invention, can be seen in that the spindle nut is movably connected to the reduction gear, which is in particular formed as a so-called harmonic drive gear.

In this connection there is the possibility that the spindle nut is rotationally rigidly joined to a flexible, cup-shaped toothed sleeve of the harmonic drive gear. This connection can occur directly or through the intermediate placement of another component. Preferably, in this connection a rotating sleeve can be arranged between the toothed sleeve and the spindle nut, the rotating sleeve being rotationally rigidly connected at one end to the toothed sleeve and at the other end to the spindle nut.

This rotating sleeve is for example supported rotationally by means of oblique roller bearings inside the pump device.

Apart from the toothed sleeve, a harmonic drive gear generally exhibits a wave generator and a rotationally rigid ring element. The wave generator is arranged inside the toothed sleeve and deflects it so far radially outwards at two opposite points due to its flexibility that outer teeth on the toothed sleeve engage inner teeth on the fixed ring element at these two opposite points.

In this way the wave generator of the harmonic drive gear can be rotationally rigidly joined to a first spur wheel of the spur gear, whereby a second spur wheel is arranged rotationally rigidly on the drive shaft which is driven by at least one motor.

This type of spur gear is also extremely low-wearing, is characterised by a high efficiency and can, where applicable, be formed to be self-locking and self-braking. One possibility for this type of spur gear is a double helical gear.

With regard to the drive shaft it should be noted that two or more electric motors can transfer their driving power to it or that two or more drive shafts can be arranged in the circumferential direction about the first spur wheel of the spur gear with corresponding electric motors. Consequently, appropriate redundancy of the drive is provided, whereby due to the many electric motors driving a drive shaft, also smaller and more economical motors can be used which through combined action produce a correspondingly high and desired drive power.

Simple suction of hydraulic fluid and pumping in the direction of the valve can for example be realised in that the piston is supported for adjustment in a piston chamber of the cylinder in the piston longitudinal direction, whereby the piston chamber exhibits at least a suction and a discharge opening on its face side. The hydraulic fluid can be drawn into the piston chamber via the suction hole with appropriate movement of the piston and on changing the direction of piston movement, the drawn-in hydraulic fluid can be pumped under pressure in the direction of the valve via the discharge hole.

In order to close the respective other hole during suction and pumping in a simple manner, a non-return valve, subject to a force and set opposing the hydraulic fluid flow direction through this hole, can be assigned to each hole. This means that with the suction hole the non-return valve is subject to a force in the direction of the suction hole and in the direction of the piston for the discharge hole. Each respective non-return valve only opens through the corresponding piston movement in order to open the suction hole or alternatively the discharge hole.

In order to arrange the non-return valves in a simple manner relative to the holes and to be able to replace them as required, and also to be able to form the holes, the holes can be formed in a cylinder bottom plate, in particular releasably fixed, on the cylinder. The holes pass through this cylinder bottom plate, whereby the corresponding non-return valves are assigned to the holes in the piston chamber.

In order to be able to store a certain amount of hydraulic fluid inside the pump device, it can be considered advantageous if the end of the suction hole facing away from the piston opens into an intermediate reservoir of the pump device. In this intermediate reservoir there is at least so much hydraulic fluid that the operation is ensured for a certain time even with an interruption in the further feed of the hydraulic fluid. In addition, the intermediate reservoir can also be used for other purposes, as will be explained in the following.

In order to be able to pump hydraulic fluid in a simple manner through the discharge opening in the direction of the valve, the discharge opening can be joined to a discharge pipe for carrying the hydraulic fluid in the direction of the valve.

In order in this respect to maintain the appropriate pressure in the hydraulic fluid and not to be concerned about any external influences, the discharge pipe can be brought out through the intermediate reservoir from a pump housing.

In order not to continually operate the pump device according to the invention for applying pressure to the appropriate valve, a connecting pipe for the connection of an accumulator can branch off the discharge pipe. This accumulator contains sufficient hydraulic fluid to be able to compensate leakage losses over a longer time period and it also stores hydraulic fluid so that the pump device is only used intermittently.

In this connection it can also be regarded as advantageous if the accumulator exhibits a pressure storage device, especially in the form of Belleville springs. Such springs are generally designed with a conical cup shape and are spring washers that can be loaded in the axial direction. A spring assembly can be formed from these springs, whereby stacking can occur both in parallel as well as in series. Mixed types of this stacking are also possible. In this respect parallel stacking is taken to mean a similar arrangement of many springs one above the other, whereas with serial stacking springs are arranged turned through 180° relative to one another.

Where applicable, in order to supply other devices with hydraulic fluid, at least one branch pipe can branch off the discharge pipe and/or the discharge hole.

A first possibility of supplying a further device can be seen in that a first branch pipe leads to a pressure switch. This can be used such that on reaching a predetermined pressure or with the undercutting of a predetermined pressure a certain activity, signal or similar action is triggered.

With an embodiment according to the invention it is favourable to consider if the pressure switch outputs an electrical control signal for opening a safety valve on reaching a predetermined hydraulic fluid pressure in the first branch pipe. In this way the pressure in the pressure device is prevented from becoming too high. The hydraulic fluid can where applicable be discharged from the pump device by means of the safety valve. A suitable safety valve can be arranged at an appropriate point on the pump device to discharge hydraulic fluid there. A possible embodiment for such a safety valve is for example a solenoid valve or similar device.

In order to be able to arrange the safety valve at a predetermined point, the safety valve can be arranged in a second branch pipe. In this way it can be subjected directly to the hydraulic fluid present from the discharge pipe and/or the discharge hole.

With a solenoid valve there are often problems with its proper actuation so that with an embodiment according to the invention, the safety valve can be formed as a mechanically actuated non-return valve. In this way the valve is simply constructed and can be always actuated reliably and under control.

In order to be able to initiate such a mechanically actuatable non-return valve using the pressure switch, the electrical control signal from the pressure switch can be transferred to an electric servomotor, especially a stepper motor, through which the safety valve can be mechanically actuated.

To facilitate a simple mechanical coupling between the servomotor and safety valve, a pinion can be rotationally connected to the servomotor, the said pinion being drive-connected to a cam disc, whereby an actuating plunger of the safety valve is in contact with the cam disc. With appropriate rotation of the cam disc the actuating plunger of the safety valve is displaced for opening and closing the valve.

Here, it can be seen as adequate if the cam disc exhibits at least one actuating cam along its circumference. With an appropriate electrical control signal present, the cam disc is rotated so far by the servomotor that the cam deflects the actuating plunger, thus opening the safety valve. If a corresponding emergency is no longer present, the cam disc can be rotated back into its initial position in which the actuating cam is no longer in contact with the actuating plunger.

In order to reduce the friction between the actuating plunger and the cam disc, the actuating plunger can be a roller plunger which is in rolling contact with its roller on the circumferential surface of the cam disc on which the actuating cam is arranged.

In order to always ensure a reliable contact between the roller plunger and the circumferential surface of the cam disc, the roller plunger can be subjected to spring pressure in the direction of the cam disc.

In order to be able to reclose the safety valve where necessary when the servomotor fails, an automatic reverse rotation device can be arranged on the cam disc and/or on the servomotor for the reverse rotation of the cam disc. This reverse rotation device ensures that for example with an interruption in the electrical supply, damage to the servomotor or similar problem, the safety valve can be closed again in that the cam disc is rotated back far enough whereby the actuating cam and actuating plunger are no longer in contact with one another.

Such a reverse rotation device can for example be directly assigned to the cam disc in that it stresses an appropriate spring during its rotation into the actuation position and can be automatically rotated back to its initial position by the spring tension where applicable. In another embodiment a wound or spiral spring, similar to a clockwork spring, can be assigned to the servomotor as a restoring device, which by means of the actuation of the servomotor for opening the safety valve can be transferred from its essentially unstressed state into a stressed state. If the servomotor operates properly, then with the reverse rotation of the cam disc the appropriate spring is reset to its essentially unstressed state. However, if the servomotor fails or can no longer be actuated, automatic restoration of the cam disc for closure of the safety valve can occur by means of the spring tension.

A simple arrangement of such an appropriate automatic reverse rotation device can be seen if the wound or spiral spring is drive-connected to the servomotor at the rear side of it facing away from the pinion.

In order when opening the safety valve to be able to discharge the appropriate hydraulic fluid in a simple and defined way, a feedback pipe for feeding back the hydraulic fluid when the safety valve opens can run from the valve to the intermediate reservoir. Apart from in the intermediate reservoir, the appropriate hydraulic fluid can also enter where applicable via the feed line opening out in the intermediate reservoir for eliminating the overpressure. However, it should be pointed out that the amount of this hydraulic fluid to be fed back is extremely low and would only lead to a slight forcing back of the hydraulic fluid present in the feed line.

In order to simply maintain the pump device according to the invention and also to be able to assemble it, it can be designed for modularity. One module can for example comprise the electrical drive device, whereas another module includes the pump-cylinder unit and another module for example the intermediate reservoir. The modules are releasably joined together and may be composed of further sub-module units.

To support the cam disc rotationally in a simple manner without having to provide special devices in the pump device, the cam disc can be supported rotationally on an external circumference of the rotating sleeve. On the rotating sleeve the spindle nut is releasably mounted, whereby the spindle nut can be arranged completely in an appropriate inner space of the rotating sleeve and whereby the cam disc can be rotationally supported at the same time in the region of this inner space on the outer circumference of the rotating sleeve.

In order to be able to mount the pump device in a simple manner and where applicable also remotely by means of an appropriate vehicle on a pipeline, tree or similar item of equipment in the production of crude oil or natural gas, a quick-release coupling device can be arranged between the pump housing and the hydraulic fluid supply pipe. If the accumulator is also mounted on the pump housing or integrated into the housing, then it can also be mounted on the appropriate feed pipe to the valve, whereby however the accumulator can also be fitted separately and by means of an appropriate dedicated quick-release coupling device to this pipe leading to the valve. In this way, there is for example the possibility of removing and replacing the pump housing with the drive device and piston-cylinder unit separately from the accumulator.

For safety reasons it may be regarded as favourable if at least two servomotors are arranged for redundancy. The redundant arrangement has already been mentioned in connection with the electric motors of the drive device. This redundant arrangement is correspondingly also of advantage for the servomotors. Each of these servomotors can be separately controlled by means of an appropriate signal from the pressure switch or also by means of an external signal, whereby the safety valve is to be opened or closed.

In principle various fluids can be used as the hydraulic fluid, whereby fluids already in use at the point of application can be used to advantage. Such a fluid is for example a so-called inhibitor, which is an injection fluid for injecting into the produced material, with most trees or similar equipment in the production of crude oil and natural gas. This injection fluid is adequately available in the region of a tree so that no supply problems occur at the point of application. At the same time a leak of the injection fluid in the direction of the transported raw material is relatively uncritical because it is in any case added to the raw material during production.

In order to monitor the actuation of the pump device in a simple manner, a position sensor can be assigned at least to the threaded spindle. By means of the corresponding position determination of the threaded spindle, the direct position of the piston is given and by means of its movement, information about the quantity of pumped hydraulic fluid is given.

BRIEF DESCRIPTION OF THE DRAWINGS

Advantageous embodiments of the invention are explained in more detail in the following based on the figures enclosed with the drawing. The following are shown.

DETAILED DESCRIPTION OF SPECIFIC EMBODIMENTS

Figure 1:
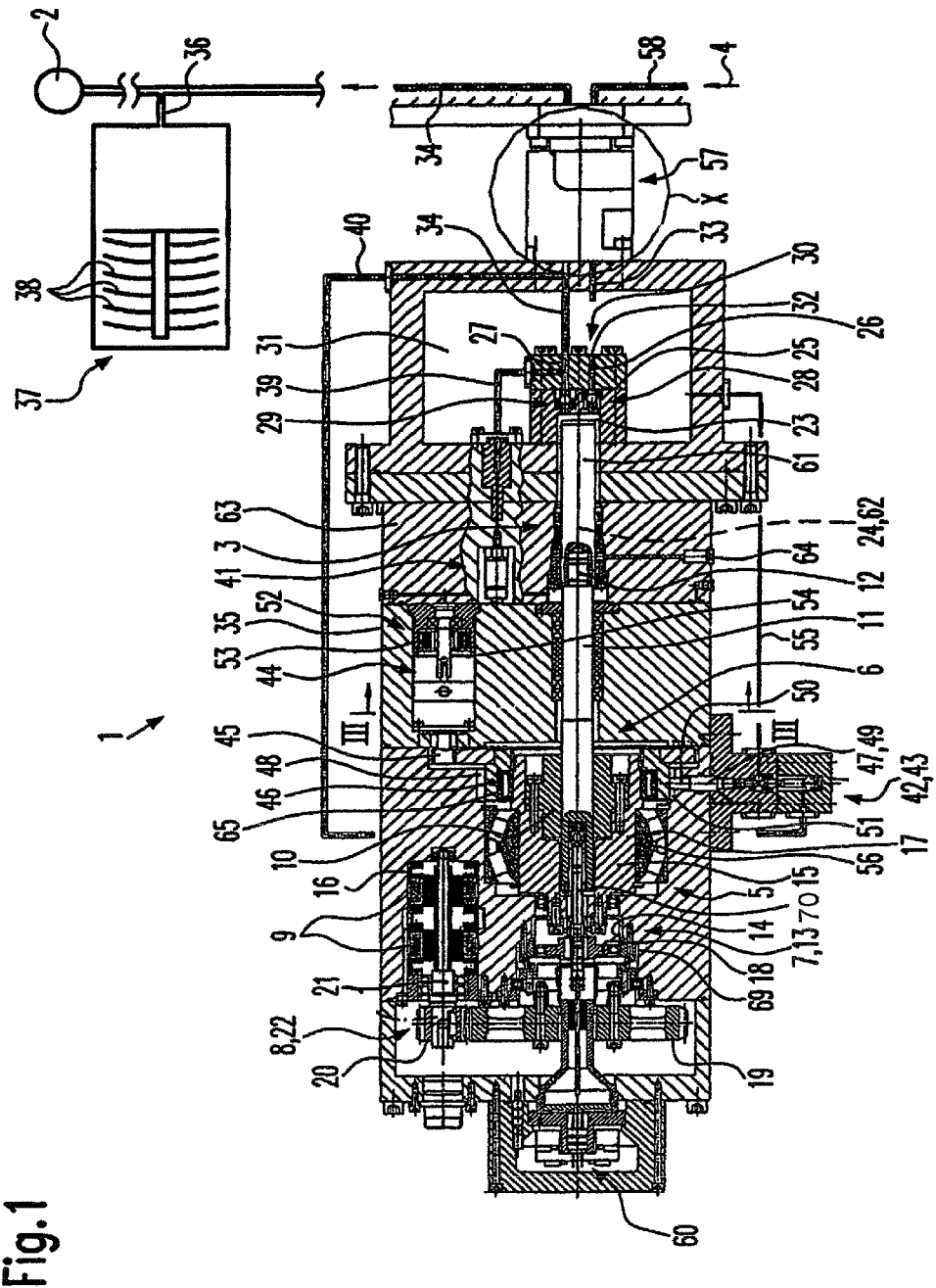
FIG. 1: a longitudinal section through an embodiment of a pump device according to the invention.

In FIG. 1 a longitudinal section is shown through an embodiment of a pump device 1 according to the invention. This exhibits a drive device 5, which is actuated electrically and is formed from a series of subgroups. A first subgroup is a spindle drive 6 of a rotationally but axially immovably supported spindle nut 10 and an axially movable but rotationally rigidly supported threaded spindle 11. The spindle nut 10 is inserted into a corresponding inner hole or inner space of a rotating sleeve 15 and is releasably attached to it there by means of appropriate threaded bolts. The rotating sleeve 15 is supported rotationally by means of a series of oblique roller bearings inside a pump housing 35.

The rotating sleeve 15 is movably connected at its end facing away from the spindle nut 10 to a reduction gear 7. This reduction gear 7 as a further part of the drive device 5 is formed as a so-called harmonic drive 13. Such a harmonic drive 13 comprises a flexible toothed sleeve 14, a fixed ring element 69 and a wave generator 18 arranged inside the toothed sleeve 14. The toothed sleeve 14 is releasably connected at its closed side to an end 16 of the rotating sleeve 15. The wave generator 18 is movably connected to a spur gear 8 as a further part of the drive device 5. In particular a rotationally rigid connection between the wave generator 18 and a first spur wheel 19 occurs. This engages at least a second spur wheel 20, whereby both spur wheels 19, 20 form a helical gear 8 and in particular a double helical gear 22. The second spur wheel 20 is rotationally rigidly arranged at a drive shaft 21, whereby two electric motors 9, in particular in the form of a synchronous or asynchronous motor, act on the drive shaft 21.

There is the possibility of arranging several such drive shafts with the second spur wheel 20 in the circumferential direction about the first spur wheel 19 in order to increase the redundancy of the pump device 1 according to the invention with regard to its drive device 5. Accordingly, each of the drive shafts 21 is assigned one, two or more electric motors 9.

For determining the position, in particular of the threaded spindle 11 movable in the longitudinal direction 24, a code carrier 70 of a position sensor 60 is inserted into it at its end assigned to the spindle nut 10 and releasably attached there. Such a code carrier exhibits a position-specific pattern which is scanned by appropriate scanning devices of the position sensor 60 and converted into a corresponding position of the threaded spindle 11.

The threaded spindle 11 is releasably joined at its actuating end 12 to a piston 61 which is supported for alternating movement in a corresponding piston chamber 23 of a piston-cylinder unit 3 in the longitudinal direction 24 or piston longitudinal direction 62. The piston-cylinder unit 3 comprises accordingly another cylinder 63 which is formed by various module units of the modular constructed pump housing 35. In the embodiment shown the cylinder comprises at least the housing parts in which the corresponding piston chamber 23 is contained.

On its face side 25 the cylinder 63 or the piston chamber 23 exhibits a cylinder bottom plate 30, in which a suction hole 26 and a discharge hole 27 are formed essentially parallel to one another. The suction hole 26 is assigned a non-return valve 28 on the side of the piston chamber 23, the non-return valve being subjected to spring pressure in the direction of the suction hole 26. Analogously the discharge hole 27 is assigned a non-return valve 29 on the side of the piston chamber 23, the non-return valve being subjected to a spring pressure in the direction of the piston 61.

If the piston moves to the left in FIG. 1, the non-return valve 28 is opened by means of an appropriate low pressure in the piston chamber 23 and hydraulic fluid 4 enters the piston chamber 23 through the suction hole 26. If the piston 61 moves to the right in FIG. 1, the hydraulic fluid present in the piston chamber 23 is forced into the discharge hole 27 via the open non-return valve 29.

The suction hole 26 opens with its end 32 facing away from the piston 61 into an intermediate reservoir 31, which essentially encloses the cylinder bottom plate 30. The intermediate reservoir 31 is used for the storage of hydraulic fluid, which can be fed by means of a feed pipe 33 opening into the intermediate reservoir. The feed pipe 33 is connected to a hydraulic fluid supply pipe 58 by means of a quick-release coupling device 57. This quick-release coupling device 57 is also used for the connection of a discharge pipe 34, extending from the discharge hole 27 through the intermediate reservoir 31 and which is then routed further in the direction of the valve 2. In addition, at least the pump housing 35 of the pump device 1 is releasably attached to an appropriate device for the production of crude oil and natural gas, such as a pipeline, tree or similar facility, by the quick-release coupling device 57.

The discharge pipe 34 exhibits at its section running between the quick-release coupling device 57 and the valve 2 at least a branching connecting pipe 36, to which an accumulator 37 is connected as a pressure vessel for hydraulic fluid. In one embodiment this pressure vessel contains a number of Belleville springs which are stacked in parallel and/or in series.

In the region of the intermediate reservoir 31 or of the cylinder bottom plate 30 a first and a second branch pipe 39, 40 branch from the discharge pipe 34 respectively from the discharge hole 27. The first branch pipe 39 extends up to a pressure switch 41. By means of this pressure switch an electrical signal is given depending on the pressure of the hydraulic fluid in the first branch pipe 39, at least when the hydraulic fluid exceeds a predetermined value. This electrical signal is passed to a servomotor 44, such as for example a stepper motor, for its actuation. Generally, for reasons of redundancy two such servomotors 44, 59 are arranged, refer also to FIG. 3. The servomotor 44 exhibits a drive shaft at one end of which a pinion 45 is arranged. This engages a cam disc 46 which is rotationally supported on an outer circumference 56 of the rotating sleeve 15 by means of a roller bearing 65. The cam disc 46 exhibits teeth assigned to the pinion 45 and at least an actuating cam 48, which, with appropriate actuation of the servomotor 44 due to the electrical signal of the pressure switch 41, comes into contact with an actuating plunger 47, formed as a roller plunger 49, of the safety valve 42.

The roller plunger 49 exhibits on its side facing the circumferential surface 51 of the cam disc 46 a rotationally supported roller 50. The roller plunger 49 is subject to spring pressure in the direction of the circumferential surface 51 of the cam disc 46 so that the roller 50 is in rolling contact.

The safety valve 42 is formed as a mechanically actuated non-return valve 43. An appropriate, essentially spherical valve element can be removed from its valve seating by the actuating plunger 47 when the roller 5 runs onto the actuating cam 48.

By opening the non-return valve 43 the second branch pipe 40, which is routed round the pump housing 35 up to the non-return valve 43, is connected to a feedback pipe 55. This opens into the intermediate reservoir 31.

The valve element of the non-return valve 43 is subject to a force from an appropriate spring element in the direction of the closed position so that without deflection by the actuating plunger 47 it is in the closed state.

A reverse rotation device 52 in the form of a wound or spiral spring 53, similar to a clockwork spring, is assigned to the servomotor 44 on its rear side 54 facing away from the pinion 45. With appropriate actuation of the servomotor 44 for the rotation of the cam disc 46 for opening the non-return valve 43 the wound/spiral spring is transferred from its essentially unstressed state to a stressed state. If a reverse rotation of the cam disc 46 occurs by means of the servomotor 44 for the closure of the non-return valve 43, the wound/spiral spring is again relieved by this appropriate reverse rotation. When the servomotor 44 fails and with the non-return valve 43 open an automatic and self-actuating reverse rotation of the cam disc 46 occurs by means of the tension on the wound/spiral spring so that closure of the non-return valve 43 both by the spring action of the valve element in the direction of the closed position and also in particular by the reverse rotation force of the wound/spiral spring as reverse rotation device 52 is ensured.

For the further control and monitoring of the pump device 1 there is also the possibility of accordingly arranging a leakage and/or pressure sensor 64 to the side in the pump housing 35, whereby the arrangement can also occur at another point of the pump housing.

The housing 35 is overall of modular construction, whereby a first module is assigned essentially to the drive device 5, a second module comprising where applicable sub-modules is assigned to the cylinder 63 and finally a module is assigned to the safety valve 42.

Figure 2:
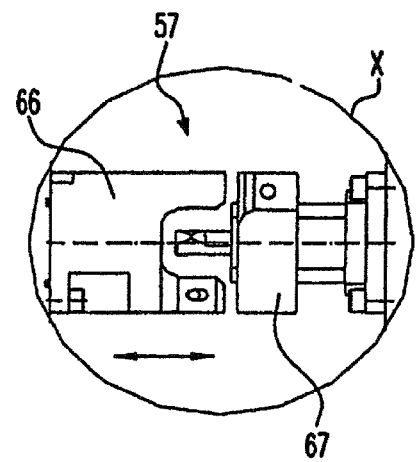
FIG. 2: an enlarged illustration of detail "X" from FIG. 1.

In FIG. 2 detail "X" from FIG. 1 is enlarged for the illustration of the quick-release coupling device 57. This is formed from two coupling parts 66, 67, which can be connected together in a simple manner for attaching the pump device to an appropriate device as well as for making the fluid connection both between the pump device 1 and valve 2 and also between the pump device 1 and hydraulic fluid supply pipe 58. The connection can be made remotely by means of appropriate vehicles.

Figure 3:
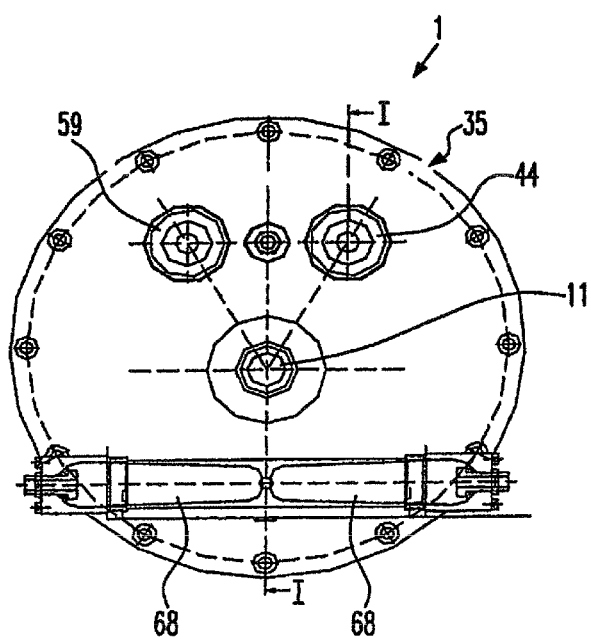
FIG. 3: a section along the line III-III from FIG. 1, whereby the longitudinal section according to FIG. 1 corresponds to a section along the line I-I from FIG. 3.

In FIG. 3 a section along the line III-III from FIG. 1 is illustrated, whereby FIG. 1 corresponds to a section along the line I-I in FIG. 3.

With the section according to FIG. 3 in particular two redundantly arranged servomotors 44, 59 can be seen, each of which can be controlled by the pressure switch 41. A corresponding control can also occur from outside of the pump device 1 and under remote control. In the lower part of the pump housing 35 of the pump device 1 at least two compensators 68 are illustrated which in particular with temperature changes can compensate for volume changes in the hydraulic fluid by appropriate intake or discharge of the hydraulic fluid.

According to the invention, an electrically actuated and operating drive device 5 is given, which is releasably attached as a module to a pump housing 35 and which acts as actuator for the actual pump of piston 61 and cylinder 63. The drive device is composed of various subgroups which operate with very low wear and are therefore maintenance-friendly and which exhibit high efficiency and a compact construction.

By means of this electrical actuator there is the possibility of exerting in a simple way a pressure of up to 1.5 kbar or more with a suitable piston.

As a safety device, the pump device 1 is assigned a servo or stepper motor 44 which mechanically opens a safety valve 42 when the pressure is too high or a similar condition arises. For reasons of redundancy the servomotor 44 is arranged doubled up and each of the servomotors is assigned an automatically operating reverse rotation device 52. The hydraulic fluid used by the pump device 1 according to the invention is an injection fluid which for example is almost always used with marine trees in the production of crude oil and gas and is a so-called inhibitor. This fluid is available in adequate quantities at the point of application so that no supply deficiencies occur nor need the fluid be brought in a complex way to the appropriate point of application. Even with a leakage of the appropriate fluid there is no disadvantage, because this fluid is in any case added to the produced raw material.

The pump device 1 according to the invention exhibits the intermediate reservoir 31 which both encloses the actual pump parts and at the same time contains a supply of the hydraulic fluid, facilitating appropriate supply with hydraulic fluid over a longer period of time if a leak occurs on the valve 2 to be supplied. In addition, the feedback pipe 55, which feeds back hydraulic fluid when the safety valve trips, is also connected to this intermediate reservoir 31. In this way there is no discharge into the environment and similarly there is no corresponding contamination nor any feedback to a remotely situated place, such as for example from the sea bed to the sea surface. The accumulator 37 fulfils another important function, because it essentially acts as a pressure vessel due to the arrangement of the Belleville springs. With appropriate size rating of the accumulator, valve and actual pump, the pump can operate free of maintenance over a long period of time, whereby due to the arrangement of the pressure vessel, the pump only needs to be operated rarely. As an example it is pointed out that with a required pressure of approximately one kbar for the valve 2 and a generated pressure by the pump device 1 of for example 1.4 kbar through intermittent actuation of the pump device 1, the pressure vessel 37 contains hydraulic fluid with approximately 1.4 kbar. This means that the pump of the pump device 1 does not for example need to be actuated until the pressure loss in the pressure vessel amounts to less than approximately 0.4 kbar. It is only when the pressure falls below a figure of 1.0 kbar that the pump operates again and recharges the pressure vessel.

The complete pump device 1 can be fitted or removed in a simple manner by a remotely controlled vehicle or even by a diver at the point of application particularly also by using the quick-release coupling device 57.

There is also the possibility of accessing the pump device 1 remotely or also at the point of application in that, for example, the appropriate functions, such as actuation of the servomotor 44 or actuation of the electric motor 9, are externally controlled.

Appropriate monitoring of the valve 2, which is generally employed as a downhole safety valve, can also occur by means of the pump device 1. For example, pressure monitoring or also monitoring of other features of the safety valve 2 can occur by means of the pump device 1 and its electrical connection to a remote place.

The invention claimed is:

1. A system, comprising:
a hydrocarbon production safety valve system, comprising:
a hydraulic pump comprising a hydraulic inlet and a hydraulic outlet, wherein the hydraulic pump is configured to pump a hydraulic fluid from the hydraulic inlet to the hydraulic outlet;
a hydraulically actuated safety valve coupled to the hydraulic outlet, wherein the hydraulically actuated safety valve receives the hydraulic fluid from the hydraulic outlet, the hydraulically actuated safety valve and the hydraulic pump are physically separate from one another, and the hydraulically actuated safety valve is proximate to the hydraulic pump; and
a first servomotor and a second servomotor, wherein the first and second servomotors are arranged redundantly with respect to one another, and the first and second servomotors are configured to operate an internal safety valve.

2. The system of claim 1, wherein the hydraulic pump and the hydraulically actuated safety valve are configured to be subsea devices.

3. The system of claim 1, wherein the hydraulic pump comprises:
a piston-cylinder unit having a piston disposed within a cylinder, the cylinder comprising:
a first port coupled to an internal discharge line disposed in an interior of the hydraulic pump and coupled to the hydraulic outlet; and
a second port coupled to an intermediate reservoir disposed in the interior of the hydraulic pump, wherein the intermediate reservoir is configured to store a portion of the hydraulic fluid; and
an electrical drive movably coupled to the piston, wherein the electrical drive is configured to alternately move the piston in opposite directions between a first position and a second position within the cylinder.

4. The system of claim 3, wherein the piston is configured to move toward the first position to drive the hydraulic fluid from the cylinder out through the hydraulic outlet, and the piston is configured to move toward the second position to draw the hydraulic fluid from the intermediate reservoir into the cylinder.

5. The system of claim 4, wherein the hydraulic pump comprises:
a first non-return valve coupled to the first port, wherein the first non-return valve is configured to block flow of the hydraulic fluid from the hydraulic outlet into the cylinder; and
a second non-return valve coupled to the second port, wherein the second non-return valve is configured to block flow of the hydraulic fluid from the cylinder into the intermediate reservoir.

6. The system of claim 3, wherein the hydraulic pump comprises:
a first branch line coupled to the internal discharge line;
a second branch line coupled to the internal discharge line;
an the internal safety valve, wherein an inlet of the internal safety valve is coupled to the second branch line, and an outlet of the internal safety valve is coupled to a feedback line coupled to the intermediate reservoir; and
an internal pressure switch coupled to the first branch line, wherein the internal pressure switch is configured to output a signal to move the internal safety valve from a closed position to an open position when a pressure of the first branch line exceeds a predetermined value, and the internal safety valve in the open position is configured to transfer the hydraulic fluid from the second branch line to the feedback line.

7. The system of claim 6, wherein the first and second servomotors are configured to receive the signal from the internal pressure switch and open the internal safety valve when the pressure of the first branch line exceeds the predetermined value.

8. The system of claim 1, comprising a quick-release coupling configured to couple the hydraulic inlet to a hydraulic fluid supply pipe and the hydraulic outlet to a hydraulic fluid discharge pipe, wherein the quick-release coupling is configured to convey only the hydraulic fluid.

9. The system of claim 1, comprising:
an accumulator disposed between the hydraulic pump and the hydraulically actuated safety valve, wherein the accumulator is configured to store a portion of the hydraulic fluid, and the accumulator is physically separate from the hydraulic pump and the hydraulically actuated safety valve.

10. The system of claim 3, wherein the electrical drive comprises a spindle drive, a reduction gear, a spur gear, at least one drive shaft, at least one electric motor configured to rotate the at least one drive shaft, a spindle nut, and a threaded spindle;
wherein the spindle nut is threadingly engaged with the threaded spindle and is movably connected to the reduction gear, and the spindle nut is rotatable and axially immovable;
wherein the threaded spindle has an actuating end releasably connected to the piston, and the threaded spindle is axially movable;
wherein the reduction gear comprises a flexible, cup-shaped toothed sleeve coupled to the spindle nut; and
wherein the spur gear comprises a first helical spur wheel rotationally rigidly connected to a wave generator, and a second helical spur wheel rotationally rigidly arranged on the at least one drive shaft.

11. A system, comprising:
a hydraulic pump configured to actuate a hydraulically actuated safety valve of a hydrocarbon production system, wherein the hydraulic pump comprises a hydraulic inlet and a hydraulic outlet, the hydraulic pump is configured to pump a hydraulic fluid from the hydraulic inlet to the hydraulically actuated safety valve coupled to the hydraulic outlet, the hydraulic pump is configured to be disposed external to the hydraulically actuated safety valve, and the hydraulic pump is configured to be disposed proximate to the hydraulically operated safety valve; and
a first servomotor and a second servomotor, wherein the first and second servomotors are arranged redundantly with respect to one another, and the first and second servomotors are configured to operate an internal safety valve of the hydraulic pump.

12. The system of claim 11, wherein the hydraulic pump is configured to be a subsea device.

13. The system of claim 11, wherein the hydraulic pump comprises:
a piston-cylinder unit having a piston disposed within a cylinder, the cylinder comprising:
a first port coupled to an internal discharge line disposed in an interior of the hydraulic pump and coupled to the hydraulic outlet; and
a second port coupled to an intermediate reservoir disposed in the interior of the hydraulic pump, wherein the intermediate reservoir is configured to store a portion of the hydraulic fluid; and
an electrical drive movably coupled to the piston, wherein the electrical drive is configured to alternately move the piston in opposite directions between a first position and a second position within the cylinder.

14. The system of claim 13, wherein the piston is configured to move toward the first position to drive the hydraulic fluid from the cylinder out through the hydraulic outlet, and the piston is configured to move toward the second position to draw the hydraulic fluid from the intermediate reservoir into the cylinder.

15. The system of claim 14, wherein the hydraulic pump comprises:
a first non-return valve coupled to the first port, wherein the first non-return valve is configured to block flow of the hydraulic fluid from the hydraulic outlet into the cylinder; and
a second non-return valve coupled to the second port, wherein the second non-return valve is configured to block flow of the hydraulic fluid from the cylinder into the intermediate reservoir.

16. The system of claim 13, wherein the hydraulic pump comprises:
a first branch line coupled to the internal discharge line;
a second branch line coupled to the internal discharge line;
an the internal safety valve, wherein an inlet of the internal safety valve is coupled to the second branch line, and an outlet of the internal safety valve is coupled to a feedback line coupled to the intermediate reservoir; and
an internal pressure switch coupled to the first branch line, wherein the internal pressure switch is configured to output a signal to move the internal safety valve from a closed position to an open position when a pressure of the first branch line exceeds a predetermined value, and the internal safety valve in the open position is configured to transfer the hydraulic fluid from the second branch line to the feedback line.

17. A method, comprising:
pumping a hydraulic fluid from a hydraulic outlet of a hydraulic pump to a hydraulically actuated safety valve of a hydrocarbon production system, wherein the hydraulic pump comprises a hydraulic inlet and the hydraulic outlet, and the hydraulic pump is configured to pump a hydraulic fluid from the hydraulic inlet to the hydraulic outlet;

actuating the hydraulically actuated safety valve using the hydraulic fluid pumped from the hydraulic pump, wherein the hydraulically actuated safety valve and the hydraulic pump are configured to be physically separate from one another, and the hydraulically actuated safety valve is configured to be proximate to the hydraulic pump; and operating an internal safety valve of the hydraulic pump with a redundant set of a first servomotor and a second servomotor.

18. The method of claim 17, comprising sensing an internal pressure of the hydraulic fluid inside the hydraulic pump using an internal pressure switch, and opening the internal safety valve inside the hydraulic pump to transfer at least a portion of the hydraulic fluid out of the hydraulic pump when the internal pressure exceeds a predetermined value.

19. The method of claim 17, comprising coupling the hydraulic pump to a hydraulic pipe using a quick-release coupling device, wherein the quick-release coupling device is configured to convey only the hydraulic fluid.

20. The method of claim 17, comprising storing at least a portion of the hydraulic fluid in an accumulator, wherein the accumulator is disposed between the hydraulic pump and the hydraulically actuated safety valve, and the accumulator is physically separate from the hydraulic pump and the hydraulically actuated safety valve.

21. The system of claim 1, wherein the hydraulic pump comprises the internal safety valve.

22. The system of claim 1, wherein the first and second servomotors are configured to receive a signal from an internal pressure switch and open the internal safety valve when a pressure exceeds a predetermined value.

23. A system, comprising:
a hydrocarbon production safety valve system, comprising:
a hydraulic pump comprising a hydraulic inlet and a hydraulic outlet, wherein the hydraulic pump is configured to pump a hydraulic fluid from the hydraulic inlet to the hydraulic outlet;
a hydraulically actuated safety valve coupled to the hydraulic outlet, wherein the hydraulically actuated safety valve receives the hydraulic fluid from the hydraulic outlet, the hydraulically actuated safety valve and the hydraulic pump are physically separate from one another, and the hydraulically actuated safety valve is proximate to the hydraulic pump; and
an electrical drive coupled to the hydraulic pump, wherein the electrical drive comprises a spindle nut, a spur gear, and a wave generator coupled to the spur gear.

24. The system of claim 23, wherein the electrical drive comprises a spindle drive, a reduction gear, at least one drive shaft, at least one electric motor configured to rotate the at least one drive shaft, and a threaded spindle.

25. The system of claim 24, wherein the spindle nut is threadingly engaged with the threaded spindle and is movably connected to the reduction gear, and the spindle nut is rotatable and axially immovable.

26. The system of claim 24, wherein the threaded spindle has an actuating end releasably connected to a piston of the hydraulic pump, and the threaded spindle is axially movable.

27. The system of claim 24, wherein the reduction gear comprises a flexible, cup-shaped toothed sleeve coupled to the spindle nut.

28. The system of claim 24, wherein the spur gear comprises a first helical spur wheel rotationally rigidly connected to the wave generator, and a second helical spur wheel rotationally rigidly arranged on the at least one drive shaft.

* * * * *